United States Patent
Zhao

(10) Patent No.: US 10,257,427 B2
(45) Date of Patent: Apr. 9, 2019

(54) INFORMATION PROCESSING METHOD AND ELECTRONIC DEVICE

(71) Applicant: LENOVO (BEIJING) LIMITED, Beijing (CN)

(72) Inventor: Qian Zhao, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 104 days.

(21) Appl. No.: 14/755,097

(22) Filed: Jun. 30, 2015

(65) Prior Publication Data
US 2016/0286127 A1 Sep. 29, 2016

(30) Foreign Application Priority Data
Mar. 24, 2015 (CN) .......................... 2015 1 0131850

(51) Int. Cl.
H04N 5/235 (2006.01)
G06K 9/00 (2006.01)
H04N 5/232 (2006.01)

(52) U.S. Cl.
CPC ....... H04N 5/2351 (2013.01); G06K 9/00221 (2013.01); G06K 9/00288 (2013.01); H04N 5/2353 (2013.01); H04N 5/23219 (2013.01); H04N 5/23245 (2013.01); H04N 5/23258 (2013.01); H04N 5/23293 (2013.01); G06T 2207/10016 (2013.01); G06T 2207/10141 (2013.01)

(58) Field of Classification Search
None
See application file for complete search history.

(56) References Cited

U.S. PATENT DOCUMENTS

2007/0291114 A1* 12/2007 Oshima .............. H04N 5/23248 348/126
2010/0053345 A1* 3/2010 Kim ...................... H04N 5/232 348/208.4
2010/0110215 A1* 5/2010 Akita ................. H04N 5/23293 348/222.1

(Continued)

FOREIGN PATENT DOCUMENTS

CN 101742101 A 6/2010
CN 102547089 A 7/2012

(Continued)

OTHER PUBLICATIONS

Handa, Ankur, et al. "Real-time camera tracking: When is high frame-rate best?." European Conference on Computer Vision. Springer, Berlin, Heidelberg, 2012. 16 pages.*

(Continued)

Primary Examiner — Ryan P Potts

(57) ABSTRACT

An information processing method and an electronic device are provided. The method comprises: detecting a first movement parameter value of an image capture unit of the electronic device in its current movement state, the first movement parameter value being associated with the current movement state of the image capture unit; determining a first capturing frame rate corresponding to the first movement parameter value based on a correspondence between movement parameter values and capturing frame rates; and controlling the image capture unit to capture an image at the first capturing frame rate.

12 Claims, 2 Drawing Sheets

---

Detect a first movement parameter value of an image capture unit of an electronic in its current movement state, the first movement parameter value being associated with the current movement state of the image capture unit — 101

Determine a first capturing frame rate corresponding to the first movement parameter value based on a correspondence between movement parameter values and capturing frame rates — 102

Control the image capture unit to capture an image at the first capturing frame rate — 103

(56) References Cited

U.S. PATENT DOCUMENTS

| | | | | |
|---|---|---|---|---|
| 2012/0057034 A1* | 3/2012 | Tanaka | .............. | H04N 5/23212 |
| | | | | 348/208.1 |
| 2012/0148098 A1* | 6/2012 | Miyata | .............. | H04N 5/23219 |
| | | | | 382/103 |
| 2012/0197488 A1* | 8/2012 | Lee | ................... | H04L 63/0861 |
| | | | | 701/36 |
| 2013/0208165 A1* | 8/2013 | An | .................. | H04N 5/232 |
| | | | | 348/333.05 |
| 2013/0242120 A1* | 9/2013 | Venkatraman | ......... | H04N 5/225 |
| | | | | 348/208.4 |
| 2014/0049653 A1* | 2/2014 | Leonard | ................ | G06T 1/0042 |
| | | | | 348/207.1 |
| 2014/0247384 A1* | 9/2014 | Hokkezu | ................ | G02B 7/36 |
| | | | | 348/345 |

FOREIGN PATENT DOCUMENTS

| | | | |
|---|---|---|---|
| CN | 103516907 A | | 1/2014 |
| JP | 2010171748 A | * | 8/2010 |

OTHER PUBLICATIONS

Gall, Juergen, et al. "Optimization and filtering for human motion capture." International journal of computer vision 87.1 (2010): 75-92. 18 pages.*
Eng. Abstract of JP2010171748 (1 pg.).
Eng. Abstract of CN103516907 (1 pg.).
Eng. Abstract of CN102547089 (1 pg.).
Eng. Abstract of CN101742101 (1 pg.).
First office action of Chinese patent application 201510131850.X dated Jul. 20, 2018 (9 pgs.).

* cited by examiner

INFORMATION PROCESSING METHOD AND ELECTRONIC DEVICE

TECHNICAL FIELD

The present disclosure relates to computer technology, and more particularly, to an information processing method and an electronic device.

BACKGROUND

With the development of science and technology as well as the market of electronic products, more and more electronic products are equipped with cameras. A user can capture images or record videos with a camera, so as to record and store contents he/she is interested in. Also, a camera can be used for recognition of human faces, so as to enhance the security of the electronic device.

SUMMARY

In an aspect, an information processing method is provided according to an embodiment of the present disclosure. The method comprises: detecting a first movement parameter value of an image capture unit of an electronic device in its current movement state, the first movement parameter value being associated with the current movement state of the image capture unit; determining a first capturing frame rate corresponding to the first movement parameter value based on a correspondence between movement parameter values and capturing frame rates; and controlling the image capture unit to capture an image at the first capturing frame rate.

Optionally, the method further comprises, subsequent to the step of controlling the image capture unit to capture an image at the first capturing frame rate: detecting whether the image captured by the image capture unit contains a human face image when no image is displayed on a display unit of the electronic device; and controlling the display unit to display an image when the image captured by the image capture unit contains a human face image.

Optionally, the step of controlling the display unit to display an image when the image captured by the image capture unit contains a human face image comprises: determining whether an overlap area between a sight range of eyes in the human face image and a capturing area of the image capture unit is in a predetermined area range; and controlling the display unit to display an image when the overlap area between the sight range of the eyes in the human face image and the capturing area of the image capture unit is in the predetermined area range.

Optionally, the step of detecting the first movement parameter value of the image capture unit of the electronic device in its current movement state comprises: detecting an ambient brightness value of the electronic device by using a light sensor of the electronic device; determining whether the ambient brightness value is greater than a predetermined brightness value; and detecting the first movement parameter value of the image capture unit of the electronic device in its current movement state when the ambient brightness value is greater than the predetermined brightness value.

Optionally, the step of detecting the first movement parameter value of the image capture unit of the electronic device in its current movement state comprises: detecting a pressure value applied on the electronic device by using a pressure sensor of the electronic device; determining whether the pressure value is greater than a predetermined pressure value; and detecting the first movement parameter value of the image capture unit of the electronic device in its current movement state when the pressure value is greater than the predetermined pressure value.

Optionally, the electronic device comprises a Global Positioning System (GPS) module and an acceleration sensor and the step of detecting the first movement parameter value of the image capture unit of the electronic device in its current movement state comprises: detecting a positional variation of the electronic device in a first predetermined time length by using the GPS module and detecting an acceleration force applied on the electronic device in the first predetermined time length by using the acceleration sensor; determining a movement velocity of the electronic device based on the positional variation and the acceleration force; and determining the movement velocity as the first movement parameter value.

Optionally, the step of detecting the first movement parameter value of the image capture unit of the electronic device in its current movement state comprises: detecting times how a position of a gravity center of the electronic device has changed in a second predetermined time length; and determining the first movement parameter value based on the times of changes.

In another aspect, an electronic device is provided according to an embodiment of the present disclosure. The electronic device comprises: a first detecting module configured to detect a first movement parameter value of an image capture unit of the electronic device in its current movement state, the first movement parameter value being associated with the current movement state of the image capture unit; a determining module configured to determine a first capturing frame rate corresponding to the first movement parameter value based on a correspondence between movement parameter values and capturing frame rates; and a first controlling module configured to control the image capture unit to capture an image at the first capturing frame rate.

Optionally, the electronic device further comprises: a second detecting module configured to detect, after the first controlling module has controlled the image capture unit to capture an image at the first capturing frame rate, whether the image captured by the image capture unit contains a human face image when no image is displayed on a display unit of the electronic device; and a second controlling module configured to control the display unit to display an image when the image captured by the image capture unit contains a human face image.

Optionally, the second controlling module is configured to: determine whether an overlap area between a sight range of eyes in the human face image and a capturing area of the image capture unit is in a predetermined area range when the image captured by the image capture unit contains a human face image; and control the display unit to display an image when the overlap area between the sight range of the eyes in the human face image and the capturing area of the image capture unit is in the predetermined area range.

Optionally, the first detecting module is configured to: detect an ambient brightness value of the electronic device by using a light sensor of the electronic device; determine whether the ambient brightness value is greater than a predetermined brightness value; and detect the first movement parameter value of the image capture unit of the electronic device in its current movement state when the ambient brightness value is greater than the predetermined brightness value.

Optionally, the first detecting module is configured to: detect a pressure value applied on the electronic device by using a pressure sensor of the electronic device; determine whether the pressure value is greater than a predetermined pressure value; and detect the first movement parameter value of the image capture unit of the electronic device in its current movement state when the pressure value is greater than the predetermined pressure value.

Optionally, the electronic device further comprises a Global Positioning System (GPS) module and an acceleration sensor, wherein the first detecting module is configured to: detect a positional variation of the electronic device in a first predetermined time length by using the GPS module and detect an acceleration force applied on the electronic device in the first predetermined time length by using the acceleration sensor; determine a movement velocity of the electronic device based on the positional variation and the acceleration force; and determine the movement velocity as the first movement parameter value.

Optionally, the first detecting module is configured to: detect times how a position of a gravity center of the electronic device has changed in a second predetermined time length; and determine the first movement parameter value based on the times of changes.

BRIEF DESCRIPTION OF THE DRAWINGS

In order to illustrate the solutions according to the embodiments of the present disclosure or the prior art clearly, the figures used for description of the embodiments or the prior art will be introduced briefly here. It is apparent to those skilled in the art that the figures described below only illustrate some embodiments of the present disclosure and other figures can be obtained from these figures without applying any inventive skills.

DETAILED DESCRIPTION OF THE EMBODIMENTS

Figure 1:
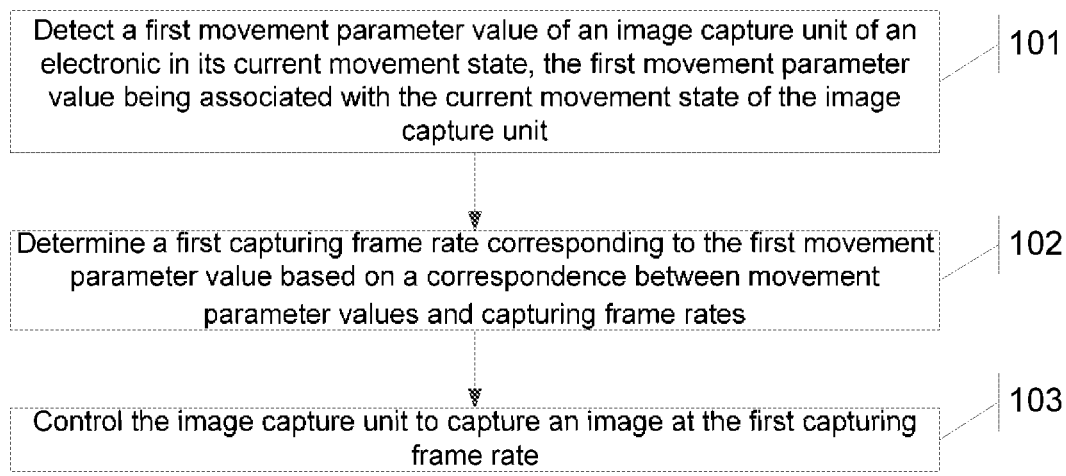
FIG. 1 is a flowchart illustrating an information processing method according to an embodiment of the present disclosure.

According to an embodiment of the present disclosure, an information processing method is provided. The method comprises: detecting a first movement parameter value of an image capture unit of an electronic device in its current movement state, the first movement parameter value being associated with the current movement state of the image capture unit; determining a first capturing frame rate corresponding to the first movement parameter value based on a correspondence between movement parameter values and capturing frame rates; and controlling the image capture unit to capture an image at the first capturing frame rate.

With the embodiments of the present disclosure, a first movement parameter value of an image capture unit of the electronic device in its current movement state can be detected and a first capturing frame rate can be determined based on the first movement parameter value, such that the electronic device can control the image capture unit to capture an image at the first capturing frame rate. For example, when the electronic device is moving significantly, the range of the capturing view angles of the image capture unit may change significantly. In this case, the capturing frame rate can be increased, so as to guarantee as much as possible that an image containing a subject can be captured. When the electronic device is changed from a significant movement to a less significant movement, the capturing frame rate can be decreased. In this way, when the image capture unit is capturing images, the amount of data to be stored can be reduced as much as possible to save storage space while guaranteeing that an image containing a subject can be captured. That is, the electronic device can determine its frame rate for image capturing adaptively depending on its different movement states, so as to adjust and set its capturing frame rate dynamically and appropriately in real time, thereby improving the applicability of the electronic device.

With the information processing method according to the embodiments of the present disclosure, the capturing frame rate can be adjusted in real time in response to the variation of the movement state of the electronic device. Accordingly, the electronic device can capture an image of the subject while it is moving fast. On the other hand, when the electronic device is moving slowly, the amount of data and the load on the image processor can be reduced as much as possible while guaranteeing that the an image containing the subject can be captured. In this way, the storage space and the storage load can be reduced and the power consumption of the electronic device can be reduced. Meanwhile, the applicability of the electronic device can be improved and the user experience can be enhanced.

In the following, the embodiments of the present disclosure will be described in further detail with reference to the figures, such that the objects, solutions and advantages of the present disclosure will become more apparent. Obviously, the embodiments described below are only some, rather than all, of the embodiments. Starting from the embodiments of the present disclosure, those skilled in the art can obtain other embodiments with applying any inventive skills. All these embodiments are to be encompassed by the scope of the present disclosure. The embodiments, and features thereof, can be combined with each other arbitrarily, provided that they do not conflict. Also, while logical sequences are shown in flowcharts, in some cases the steps as shown or described can be performed in different orders.

Further, the term "and/or" as used herein only represents a relationship between correlated objects, including three possibilities. For example, "A and/or B" means A, B, or both. In addition, the symbol "I" as used herein represents an "or" relationship between the correlated objects preceding and succeeding the symbol, unless indicated otherwise.

In an embodiment of the present disclosure, the electronic device can be a mobile phone, a tablet computer, a desktop computer, or the like. The present disclosure is not limited to any specific electronic device, as long as it includes an image capture unit.

In the following, the embodiments of the present disclosure will be described in further detail with reference to the figures, such that the above solutions will be better understood.

Referring to FIG. 1, an information processing method is provided according to an embodiment of the present disclosure. The method includes the following steps.

At step 101, a first movement parameter value of an image capture unit of an electronic device in its current movement state is detected. The first movement parameter value is associated with the current movement state of the image capture unit.

In an embodiment, the image capture unit is provided in the electronic device, i.e., it is a component of the electronic device. Hence, the current movement state of the image capture unit can also be considered as that of the electronic device.

The current movement state can refer to the movement state of the electronic device at the current time instant. For example, in a case where the electronic device is a mobile phone, when the mobile phone is placed on a table statically, its current movement state can be considered as a static state, i.e., it has a speed of zero. When the mobile phone is held in the user's hand and shaken to play a game, its current movement state can be considered as a movement state having non-zero speed. In an implementation, the movement state of the electronic device can be characterized by using different movement parameters, which can be parameters for describing the movement state of the electronic device, such as speed, acceleration and so on. In particular, different movement states of the electronic device can be described by using different movement parameters or different values of one single movement parameter.

In an implementation, the first movement parameter value of the electronic device can be detected in real time, periodically or randomly as desired and the present disclosure is not limited to any specific detection scheme. For example, in order to obtain a plurality of first movement parameter values in a sufficiently accurate manner, they can be detected in real time. As another example, in order to save power consumption when the requirement on the first parameter value is relatively low, it can be detected periodically.

Further, for different types of electronic devices, the image capture unit can be different components in the electronic device, as long as it can capture images. The present disclosure is not limited to any specific image capture unit. For example, for a mobile phone or a tablet computer, the image capture unit can be its front camera. For a camera or a video recorder, the image capture unit can be its lens and so on.

In an embodiment, the purpose of detecting the first movement parameter value is to determine a first capturing frame rate based on the first movement parameter value, such that the image capture unit can capture an image containing a subject at the first capturing frame rate and then achieve some function the user desires to perform with the electronic device on the captured subject image. That is, the first movement parameter value detected by the electronic device is only useful when the user is using the electronic device. Hence, in order to meet the user's actual requirement and to save the power consumption of the electronic device as much as possible, the electronic device can determine whether it is being used by the user and determine whether it needs to detect the first movement parameter value before starting detecting the first movement parameter value. In an implementation, there are various schemes for determining whether the electronic device is being used by the user. Two of such schemes will be explained as examples, such that they can be understood by those skilled in the art.

First Determination Scheme

Optionally, in an embodiment of the present disclosure, the step of detecting the first movement parameter value of the image capture unit of the electronic device in its current movement state includes: detecting an ambient brightness value of the electronic device by using a light sensor of the electronic device; determining whether the ambient brightness value is greater than a predetermined brightness value; and detecting the first movement parameter value of the image capture unit of the electronic device in its current movement state when the ambient brightness value is greater than the predetermined brightness value.

That is, in the embodiment of the present disclosure, it is possible to determine whether the electronic device is in a "pocket mode" by determining whether the ambient brightness value of the electronic device as detected by the light sensor is smaller than the predetermined ambient brightness value. Here, the "pocket mode" can be considered as a state in which the electronic device is placed in a lap, trouser pocket or bag of the user.

When the electronic device is placed in a small closed space, its ambient light intensity would be generally low. Hence, it is possible to determine whether the electronic device is in a "pocket mode" by determining whether the ambient brightness value as detected by the light sensor is smaller than the predetermined ambient brightness value. When it is determined that the ambient brightness value is smaller than the predetermined ambient brightness value, the electronic device can be considered to be in the "pocket mode". In this case, it is assumed that the electronic device is not being used by the user and thus the first movement parameter value, even if detected, would be useless for the user. Accordingly, the electronic device refrains from detecting the first movement parameter value to save as much power consumption as possible. In contrast, if it is determined that the ambient brightness value is greater than the predetermined ambient brightness value, the electronic device can be considered not to be in the "pocket mode". In this case, it is very likely that the electronic device is being used by the user. Accordingly, the electronic device can be controlled to detect the first movement parameter value, so as to meet the user's actual requirement and improve the intelligence of the electronic device.

Second Determination Scheme

Optionally, in an embodiment of the present disclosure, the step of detecting the first movement parameter value of the image capture unit of the electronic device in its current movement state includes: detecting a pressure value applied on the electronic device by using a pressure sensor of the electronic device; determining whether the pressure value is greater than a predetermined pressure value; and detecting the first movement parameter value of the image capture unit of the electronic device in its current movement state when the pressure value is greater than the predetermined pressure value.

That is, in the embodiment of the present disclosure, it is possible to determine whether the electronic device is in a "handheld mode" by determining whether the pressure value applied on the electronic device as detected by the pressure sensor is greater than the predetermined pressure value. Here, the "handheld mode" can be considered as a state in which the electronic device is held in the user's hand.

Moreover, in order to allow the electronic device to detect the pressure value applied on it with a high sensitivity, the pressure sensor can be provided at positions at which the user typically holds the electronic device while using it, e.g., on the left and right sides of a mobile phone. In an implementation, the predetermined pressure value can be set as a small value such that, when the user is using the electronic device, his/her holding force will generally be greater than the predetermined pressure value. In this way, it is possible to determine whether the user is holding the electronic device as accurately as possible.

Generally, when the user is holding the electronic device (e.g., a mobile phone) in his/her hand, typically he/she is using or is going to use the mobile phone. In this case, the mobile phone can be controlled to detect the first movement parameter value. Further, when the user is holding the mobile phone, there will generally be a holding force. The amplitude of the holding force can be considered as the pressure value in the embodiment of the present disclosure. Hence, it is possible to determine whether the electronic device is in the "handheld mode" by determining whether the pressure value as detected by the pressure sensor is greater than the predetermined pressure value. When it is determined that the pressure value is greater than the predetermined pressure value, the mobile phone can be considered to be held in the user's hand. In this case, it is very likely that the electronic device is being used by the user. Accordingly, the electronic device can be controlled to detect the first movement parameter value, so as to meet the user's actual requirement and improve the intelligence of the electronic device.

In an embodiment, the above two determination schemes can be implemented separately, or can be combined to improve the accuracy of the determination result as much as possible, so as to meet the user's actual requirement.

Only two determination schemes have been explained above. It can be appreciated by those skilled in the art that the above two schemes are exemplary only and descriptions of further schemes will be omitted here. Any schemes for determining whether the electronic device is being used by the user before detecting the first movement parameter value are to be encompassed by the scope of the present disclosure.

Further, in an embodiment, there may be a number of implementations for the first movement parameter value and some examples will be given below.

For example, the first movement parameter value can be a movement velocity of the electronic device. Optionally, in an embodiment of the present disclosure, the electronic device includes a Global Positioning System (GPS) module and an acceleration sensor. The step of detecting the first movement parameter value of the image capture unit of the electronic device in its current movement state includes: detecting a positional variation of the electronic device in a first predetermined time length by using the GPS module and detecting an acceleration force applied on the electronic device in the first predetermined time length by using the acceleration sensor; determining a movement velocity of the electronic device based on the positional variation and the acceleration force; and determining the movement velocity as the first movement parameter value.

That is, the movement velocity of the electronic device can be determined based on the positional variation of the electronic device in the first predetermined time length and the acceleration force applied on the electronic device in the first predetermined time length. The movement velocity can represent the movement state of the electronic device. For example, when the movement velocity is determined to be zero, the electronic device can be determined to be in a static state, e.g., when it is placed on a table, playing a movie for the user. As another example, when the movement velocity is determined to be 2 m/s, the electronic device can be determined to be in a moving state with low movement amplitude. As yet another example, when the movement velocity is determined to be 15 m/s, the electronic device can be determined to be in a moving state with high movement amplitude (i.e., a significant movement). Further, different capturing frame rates can be further determined based on different movement velocities.

Alternatively, the first movement parameter value can be times how a position of a gravity center of the electronic device has changed in a second predetermined time length.

Optionally, in an embodiment of the present disclosure, the step of detecting the first movement parameter value of the image capture unit of the electronic device in its current movement state includes: detecting times how a position of a gravity center of the electronic device has changed in a second predetermined time length; and determining the first movement parameter value based on the times of changes.

The movement variation amplitude of the electronic device in the second predetermined time length can be determined approximately based on the times how the position of the gravity center of the electronic device has changed in the second predetermined time length. The greater the times of changes is, the higher the movement amplitude is, and the more significant the movement of the electronic device will be. For example, when the second predetermined time length is 3 s and the times of changes is 15, i.e., the position of the gravity center of the electronic has changed for 15 times in 3 s, it can be considered that the electronic device has a high movement amplitude and is moving significantly.

At step 102, a first capturing frame rate corresponding to the first movement parameter value is determined based on a correspondence between movement parameter values and capturing frame rates.

Once the first movement parameter value has been detected, the electronic device can determine the first capturing frame rate corresponding to the first movement parameter value based on the correspondence between movement parameter values and capturing frame rates. Different first movement parameter values indicate different current movement states of the electronic device. For example, the current movement state may be a static state, a state having low movement amplitude or a state having significant movement. In this cases, the first capturing frame rate corresponding to the first movement parameter value can be determined for capturing images, so as to be as consistent with the current movement state of the electronic device as possible and to guarantee as much as possible that an image containing a subject can be captured by the electronic device.

That is, there can be a one-to-one correspondence between different movement parameter values and different capturing frame rates. The correspondence can be obtained by the user from theoretical tests performed using a number of image capturing units having different capturing frame rates in different movement states of the electronic devices, or from experiences based on a long-term practice. Upon detecting the movement parameter value, the electronic device can directly use the corresponding capturing frame rate. For example, a movement parameter value of 5 m/s corresponds to a capturing frame rate of 30 fps and a movement parameter value of 15 m/s corresponds to a capturing frame rate of 60 fps, and so on.

At step 103, the image capture unit is controlled to capture an image at the first capturing frame rate.

Upon determining the first capturing frame rate based on the first movement parameter value, the electronic device can control the image capture unit to capture an image at the first capturing frame rate.

That is, when the electronic device is capturing an image, its capturing frame rate can be adjusted dynamically in real time based on the movement state of the electronic device, such that the image capturing operation will not be restricted by the movement state of the electronic device itself. In this way, it is possible to guarantee that an image containing a subject can be captured, regardless of the current movement state of the electronic device. It is also possible to reduce the amount of data as much as possible, so as to save storage space.

With the embodiments of the present disclosure, a first movement parameter value of an image capture unit of the electronic device in its current movement state can be detected and a first capturing frame rate can be determined based on the first movement parameter value, such that the electronic device can control the image capture unit to capture an image at the first capturing frame rate. For example, when the electronic device is moving significantly, the range of the capturing view angles of the image capture unit may change significantly. In this case, the capturing frame rate can be increased, so as to guarantee as much as possible that an image containing a subject can be captured. When the electronic device is changed from a significant movement to a less significant movement, the capturing frame rate can be decreased. In this way, when the image capture unit is capturing images, the amount of data to be stored can be reduced as much as possible to save storage space while guaranteeing that an image containing a subject can be captured. That is, the electronic device can determine its frame rate for image capturing adaptively depending on its different movement states, so as to adjust and set its capturing frame rate dynamically and appropriately in real time, thereby improving the applicability of the electronic device.

With the information processing method according to the embodiments of the present disclosure, the capturing frame rate can be adjusted in real time in response to the variation of the movement state of the electronic device. Accordingly, the electronic device can capture an image of the subject while it is moving fast. On the other hand, when the electronic device is moving slowly, the amount of data and the load on the image processor can be reduced as much as possible while guaranteeing that the an image containing the subject can be captured. In this way, the storage space and the storage load can be reduced and the power consumption of the electronic device can be reduced. Meanwhile, the applicability of the electronic device can be improved and the user experience can be enhanced.

Optionally, in an embodiment of the present disclosure, the method further includes, subsequent to the step of controlling the image capture unit to capture an image at the first capturing frame rate: detecting whether the image captured by the image capture unit contains a human face image when no image is displayed on a display unit of the electronic device; and controlling the display unit to display an image when the image captured by the image capture unit contains a human face image.

In an embodiment of the present disclosure, no image being displayed on the display unit of the electronic device may refer to a state where the display unit of the electronic device is unlighted; whereas controlling the display unit to display an image may refer to a state where the display unit is lighted (but locked) or unlocked. For example, in a case where the electronic device is a smart phone, the unlighted state may refer to a standby state where the mobile phone has a black screen and no image is displayed on the display screen of the mobile phone. If the user needs to use the mobile phone, he/she will press a power button on the mobile phone to wake the screen and unlock the screen by entering a passcode or sliding on the screen, so as to use some function in the mobile phone. In this case, after the screen is waken or unlocked, images can be displayed on the screen of the mobile phone.

In the example where the electronic device is a mobile phone, in order to reduce the user's manual operation to press the power button, improve the intelligence of the electronic device and enhance the user experience, an embodiment of the present disclosure enables the user to wake the screen of the mobile phone faster. That is, it can be determined whether to wake the screen of the mobile phone by detecting whether an image captured by a camera of the mobile phone contains a human face image. Here the image capture unit can be the camera of the mobile phone and the image of the subject can be the human face image. When there is a human face image, someone is looking at the mobile phone and thus it can be considered that the user is using or is going to use the mobile phone. In this case, the screen of the mobile phone can be automatically lighted to display images. Further, in order to allow the determination result to be as accurate as possible, the camera here can be the front camera of the mobile phone, i.e., the camera on the same surface as the display screen of the mobile phone.

Further, when the display unit of the electronic device is controlled to display an image based on the detected human face image, it can be further determined whether the detected human face image matches a predetermined human face image and the display unit is controlled to display an image only when the detected human face image matches the predetermined human face image. The predetermined human face image can be set by the user, e.g., as a human face image of the user himself/herself, or a human face image of another user designated by the user. That is, before controlling the display unit to display an image, such determination step can be added for security authentication, so as to improve the security of information protection for the user.

Optionally, in an embodiment of the present disclosure, the step of controlling the display unit to display an image when the image captured by the image capture unit contains a human face image includes: determining whether an overlap area between a sight range of eyes in the human face image and a capturing area of the image capture unit is in a predetermined area range; and controlling the display unit to display an image when the overlap area between the sight range of the eyes in the human face image and the capturing area of the image capture unit is in the predetermined area range.

In the example where the electronic device is a smart phone and the image capture unit is a front camera of the phone, there may be such a situation in which, when the user of the electronic device is in a subway carriage with many passengers, there may be many other users surrounding the user. In this case, when the user controls the display screen to be lighted when the front camera captures a human face image, there may be another user (e.g., User A) looking at the user's phone at the same time. Since the phone is held by the user, the user's face would directly face the front camera. Hence, when the user is facing directly to the phone, it can be considered that the user wants to light up the screen of the phone. User A may be facing the front camera with an angle. In this case, with the method according to the embodiment of the present disclosure, it is possible to determine whether the user looking at the front camera is the real user of the electronic device (i.e., the user who is using the electronic device) and then determine whether to control the phone to display an image. In this way, it is possible to improve the accuracy and meet the user's actual requirement as much as possible by avoiding erroneous responses when another user is looking at the phone, thereby improving the intelligence and security of the electronic device.

Figure 2:
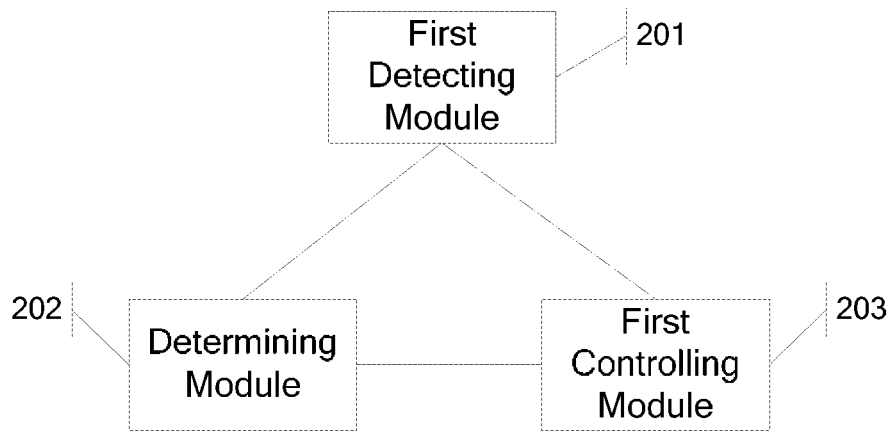
FIG. 2 is a block diagram showing a structure of an electronic device according to an embodiment of the present disclosure.

Referring to FIG. 2, based on the same inventive concept, an electronic device is provided according to an embodiment of the present disclosure. The electronic device includes a first detecting module 201, a determining module 202 and a first controlling module 203.

The first detecting module 201 is configured to detect a first movement parameter value of an image capture unit of the electronic device in its current movement state. The first movement parameter value is associated with the current movement state of the image capture unit.

The determining module 202 is configured to determine a first capturing frame rate corresponding to the first movement parameter value based on a correspondence between movement parameter values and capturing frame rates.

The first controlling module 203 is configured to control the image capture unit to capture an image at the first capturing frame rate.

Figure 3:
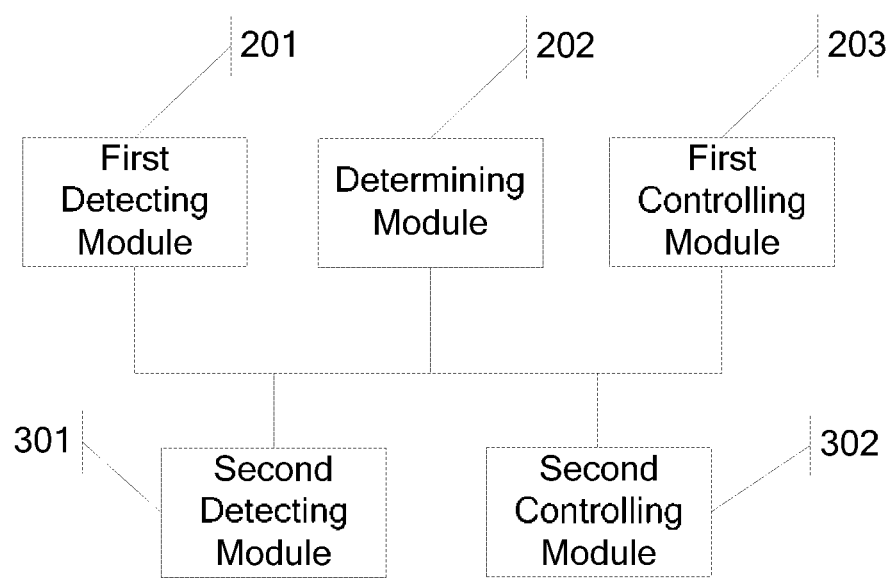
FIG. 3 is a block diagram showing an electronic device including a second detecting module and a second controlling module, according to an embodiment of the present disclosure.

Optionally, referring to FIG. 3, in an embodiment of the present disclosure, the electronic device further includes a second detecting module 301 and a second controlling module 302.

The second detecting module 301 is configured to detect, after the first controlling module has controlled the image capture unit to capture an image at the first capturing frame rate, whether the image captured by the image capture unit contains a human face image when no image is displayed on a display unit of the electronic device.

The second controlling module 302 is configured to control the display unit to display an image when the image captured by the image capture unit contains a human face image.

Optionally, in an embodiment of the present disclosure, the second controlling module 302 is configured to: determine whether an overlap area between a sight range of eyes in the human face image and a capturing area of the image capture unit is in a predetermined area range; and control the display unit to display an image when the overlap area between the sight range of the eyes in the human face image and the capturing area of the image capture unit is in the predetermined area range.

Optionally, in an embodiment of the present disclosure, the first detecting module 201 is configured to: detect an ambient brightness value of the electronic device by using a light sensor of the electronic device; determine whether the ambient brightness value is greater than a predetermined brightness value; and detect the first movement parameter value of the image capture unit of the electronic device in its current movement state when the ambient brightness value is greater than the predetermined brightness value.

Optionally, in an embodiment of the present disclosure, the first detecting module 201 is configured to: detect a pressure value applied on the electronic device by using a pressure sensor of the electronic device; determine whether the pressure value is greater than a predetermined pressure value; and detect the first movement parameter value of the image capture unit of the electronic device in its current movement state when the pressure value is greater than the predetermined pressure value.

Optionally, in an embodiment of the present disclosure, the electronic device further includes a Global Positioning System (GPS) module and an acceleration sensor. The first detecting module 201 is configured to: detect a positional variation of the electronic device in a first predetermined time length by using the GPS module and detect an acceleration force applied on the electronic device in the first predetermined time length by using the acceleration sensor; determine a movement velocity of the electronic device based on the positional variation and the acceleration force; and determine the movement velocity as the first movement parameter value.

Optionally, in an embodiment of the present disclosure, the first detecting module 201 is configured to: detect a times how a position of a gravity center of the electronic device has changed in a second predetermined time length; and determine the first movement parameter value based on the times of changes.

The first detecting module may comprise a corresponding sensor and a processor for controlling the sensor to detect and determine. The second detecting module, the plurality of determining modules and the plurality of controlling module may be implemented by the processor of the electronic device. The respective modules as mentioned above are not limited to be implemented by one or more processors.

With the embodiments of the present disclosure, a first movement parameter value of an image capture unit of the electronic device in its current movement state can be detected and a first capturing frame rate can be determined based on the first movement parameter value, such that the electronic device can control the image capture unit to capture an image at the first capturing frame rate. For example, when the electronic device is moving significantly, the range of the capturing view angles of the image capture unit may change significantly. In this case, the capturing frame rate can be increased, so as to guarantee as much as possible that an image containing a subject can be captured. When the electronic device is changed from a significant movement to a less significant movement, the capturing frame rate can be decreased. In this way, when the image capture unit is capturing images, the amount of data to be stored can be reduced as much as possible to save storage space while guaranteeing that an image containing a subject can be captured. That is, the electronic device can determine its frame rate for image capturing adaptively depending on its different movement states, so as to adjust and set its capturing frame rate dynamically and appropriately in real time, thereby improving the applicability of the electronic device.

With the information processing method according to the embodiments of the present disclosure, the capturing frame rate can be adjusted in real time in response to the variation of the movement state of the electronic device. Accordingly, the electronic device can capture an image of the subject while it is moving fast. On the other hand, when the electronic device is moving slowly, the amount of data and the load on the image processor can be reduced as much as possible while guaranteeing that the an image containing the subject can be captured. In this way, the storage space and the storage load can be reduced and the power consumption of the electronic device can be reduced. Meanwhile, the applicability of the electronic device can be improved and the user experience can be enhanced.

It can be appreciated by those skilled in the art that the above embodiment has been described with reference to an example in which it is divided into individual functional modules. In practice, the above functions can be assigned to different functional modules as desired. That is, the internal structure of the apparatus can be divided into different functional modules for achieving part or all of the above described functions. For details of the operations of the above described system, apparatus and units, reference can be made to the embodiment of the method and the description thereof will be omitted here.

It can be appreciated from the embodiments of the present disclosure that the disclosed system, apparatus and method can be implemented in alternative ways. The device embodiments as described above are illustrative only. For example, while the units have been divided in accordance with their logical functions, other divisions are possible in practice. For example, more than one unit or element can be combined or can be integrated into another system, or some features can be ignored or omitted. In addition, the coupling, direct coupling or communicative connection between various components as shown or discussed can be an indirect coupling or communicative connection via some interface, device or unit and can be electrical, mechanical or in another form.

The units described above as separated may or may not be physically separated. The components shown as units may or may not be physical units. They can be co-located or can be distributed over a number of network elements. Depending on actual requirements, some or all of the units can be selected to achieve the object of the present disclosure.

Further, all the functional units in various embodiments of the present disclosure can be integrated within one processing unit, or each of these units can be a separate unit, or two or more units can be integrated into one unit. Such integrated unit can be implemented in hardware, possibly in combination with software functional units.

The integrated units of the present disclosure as described above can be implemented as software functional modules and sold or used as standalone produces. In this case, they can be stored in a computer readable storage medium. In view of this, the technical solutions according to the embodiments of the present disclosure, or in other words a part thereof which makes contribution over the prior art, can be substantially embodied in a form of software product. The computer software product can be stored in a storage medium containing instructions which cause a computer device (which can be a personal computer, a server, a network device or the like) or a processor to perform one or more methods according to the embodiments of the present disclosure or particular parts thereof. The storage medium may be any of various mediums capable of storing program codes, such as a USB disk, a hard disk, a Read Only Memory (ROM), a Random Access Memory (RAM), a magnetic disk or an optical disc.

In particular, in an embodiment of the present disclosure, the computer program instructions corresponding to the information processing method can be stored in a storage medium such as an optical disc, a hard disk or a USB disk. The computer program instructions corresponding to the information processing method in the storage medium, when executed, include the following steps of: detecting a first movement parameter value of an image capture unit of the electronic device in its current movement state, the first movement parameter value being associated with the current movement state of the image capture unit; determining a first capturing frame rate corresponding to the first movement parameter value based on a correspondence between movement parameter values and capturing frame rates; and controlling the image capture unit to capture an image at the first capturing frame rate.

Optionally, the computer instructions include, when executed subsequent to the step of controlling the image capture unit to capture an image at the first capturing frame rate: detecting whether the image captured by the image capture unit contains a human face image when no image is displayed on a display unit of the electronic device; and controlling the display unit to display an image when the image captured by the image capture unit contains a human face image.

Optionally, the computer instructions corresponding to the step of controlling the display unit to display an image when the image captured by the image capture unit contains a human face image include, when executed: determining whether an overlap area between a sight range of eyes in the human face image and a capturing area of the image capture unit is in a predetermined area range; and controlling the display unit to display an image when the overlap area between the sight range of the eyes in the human face image and the capturing area of the image capture unit is in the predetermined area range.

Optionally, the computer instructions corresponding to the step of detecting the first movement parameter value of the image capture unit of the electronic device in its current movement state include, when executed: detecting an ambient brightness value of the electronic device by using a light sensor of the electronic device; determining whether the ambient brightness value is greater than a predetermined brightness value; and detecting the first movement parameter value of the image capture unit of the electronic device in its current movement state when the ambient brightness value is greater than the predetermined brightness value.

Optionally, the computer instructions corresponding to the step of detecting the first movement parameter value of the image capture unit of the electronic device in its current movement state include, when executed: detecting a pressure value applied on the electronic device by using a pressure sensor of the electronic device; determining whether the pressure value is greater than a predetermined pressure value; and detecting the first movement parameter value of the image capture unit of the electronic device in its current movement state when the pressure value is greater than the predetermined pressure value.

Optionally, the electronic device comprises a Global Positioning System (GPS) module and an acceleration sensor and the computer instructions corresponding to the step of detecting the first movement parameter value of the image capture unit of the electronic device in its current movement state include, when executed: detecting a positional variation of the electronic device in a first predetermined time length by using the GPS module and detecting an acceleration force applied on the electronic device in the first predetermined time length by using the acceleration sensor; determining a movement velocity of the electronic device based on the positional variation and the acceleration force; and determining the movement velocity as the first movement parameter value.

Optionally, the computer instructions corresponding to the step of detecting the first movement parameter value of the image capture unit of the electronic device in its current movement state include, when executed: detecting times how a position of a gravity center of the electronic device has changed in a second predetermined time length; and determining the first movement parameter value based on the times of changes.

While the embodiments of the present disclosure have been described above, the scope of the present disclosure is not limited thereto. Various modifications and alternatives can be made by those skilled in the art without departing from the scope of the present disclosure. These modifications and alternatives are to be encompassed by the scope of the present disclosure which is only defined by the claims as attached.

What is claimed is:

1. An information processing method, comprising:
   detecting a first movement parameter value of an image capture unit of an electronic device in its current movement state, the first movement parameter value being associated with the current movement state of the image capture unit;

determining a first capturing frame rate corresponding to the first movement parameter value based on a correspondence between movement parameter values and capturing frame rates; and controlling the image capture unit to capture an image at the first capturing frame rate dynamically;

wherein the first movement parameter value corresponds to a movement amplitude of the image capture unit based on its positional variation;

wherein detecting the first movement parameter value of the image capture unit of the electronic device in its current movement state comprises:

detecting a number of changes in a position of a center of gravity of the electronic device in a first predetermined time length as the movement amplitude; and determining the first movement parameter value based on the number of changes.

2. The method of claim 1, further comprising, subsequent to said controlling the image capture unit to capture an image at the first capturing frame rate:

detecting whether the image captured by the image capture unit contains a human face image when no image is displayed on a display unit of the electronic device; and controlling the display unit to display an image when the image captured by the image capture unit contains a human face image.

3. The method of claim 2, wherein said controlling the display unit to display an image when the image captured by the image capture unit contains a human face image comprises:

determining whether an overlap area between a sight range of eyes in the human face image and a capturing area of the image capture unit is in a predetermined area range; and controlling the display unit to display an image when the overlap area between the sight range of the eyes in the human face image and the capturing area of the image capture unit is in the predetermined area range.

4. The method of claim 1, wherein said detecting the first movement parameter value of the image capture unit of the electronic device in its current movement state comprises:

detecting an ambient brightness value of the electronic device by using a light sensor of the electronic device;

determining whether the ambient brightness value is greater than a predetermined brightness value; and detecting the first movement parameter value of the image capture unit of the electronic device in its current movement state when the ambient brightness value is greater than the predetermined brightness value.

5. The method of claim 1, wherein said detecting the first movement parameter value of the image capture unit of the electronic device in its current movement state comprises:

detecting a pressure value applied on the electronic device by using a pressure sensor of the electronic device;

determining whether the pressure value is greater than a predetermined pressure value; and detecting the first movement parameter value of the image capture unit of the electronic device in its current movement state when the pressure value is greater than the predetermined pressure value.

6. The method of claim 1, wherein the electronic device comprises a Global Positioning System (GPS) module and an acceleration sensor and said detecting the first movement parameter value of the image capture unit of the electronic device in its current movement state comprises:

detecting a positional variation of the electronic device in the first predetermined time length by using the GPS module and detecting an acceleration force applied on the electronic device in the first predetermined time length by using the acceleration sensor;

determining a movement velocity of the electronic device based on the positional variation and the acceleration force; and determining the movement velocity as the first movement parameter value.

7. An electronic device, comprising:

an image capture unit; and a processor configured to detect a first movement parameter value of the image capture unit of the electronic device in its current movement state, the first movement parameter value being associated with the current movement state of the image capture unit;

configured to determine a first capturing frame rate corresponding to the first movement parameter value based on a correspondence between movement parameter values and capturing frame rates; and configured to control the image capture unit to capture an image at the first capturing frame rate dynamically;

wherein the first movement parameter value corresponds to a movement amplitude of the image capture unit based on its positional variation;

wherein the processor is configured to:

detect a number of changes in a position of a center of gravity of the electronic device in a first predetermined time length as the movement amplitude; and determine the first movement parameter value based on the number of changes.

8. The electronic device of claim 7, wherein the processor is further configured to detect, after the processor has controlled the image capture unit to capture an image at the first capturing frame rate, whether the image captured by the image capture unit contains a human face image when no image is displayed on a display unit of the electronic device; and the processor is further configured to control the display unit to display an image when the image captured by the image capture unit contains a human face image.

9. The electronic device of claim 8, wherein the processor is configured to:

determine whether an overlap area between a sight range of eyes in the human face image and a capturing area of the image capture unit is in a predetermined area range when the image captured by the image capture unit contains a human face image; and control the display unit to display an image when the overlap area between the sight range of the eyes in the human face image and the capturing area of the image capture unit is in the predetermined area range.

10. The electronic device of claim 7, wherein the processor is configured to:

detect an ambient brightness value of the electronic device by using a light sensor of the electronic device;

determine whether the ambient brightness value is greater than a predetermined brightness value; and detect the first movement parameter value of the image capture unit of the electronic device in its current movement state when the ambient brightness value is greater than the predetermined brightness value.

11. The electronic device of claim 7, wherein the processor is configured to:

detect a pressure value applied on the electronic device by using a pressure sensor of the electronic device;

determine whether the pressure value is greater than a predetermined pressure value; and detect the first movement parameter value of the image capture unit of the electronic device in its current movement state when the pressure value is greater than the predetermined pressure value.

12. The electronic device of claim 7, further comprising a Global Positioning System (GPS) module and an acceleration sensor, wherein the processor is configured to:

detect a positional variation of the electronic device in the first predetermined time length by using the GPS module and detect an acceleration force applied on the electronic device in the first predetermined time length by using the acceleration sensor;

determine a movement velocity of the electronic device based on the positional variation and the acceleration force; and determine the movement velocity as the first movement parameter value.

\* \* \* \* \*